March 26, 1957 H. S. HOWE ET AL 2,786,507
PNEUMATIC TIRE
Filed Feb. 26, 1954 2 Sheets-Sheet 1
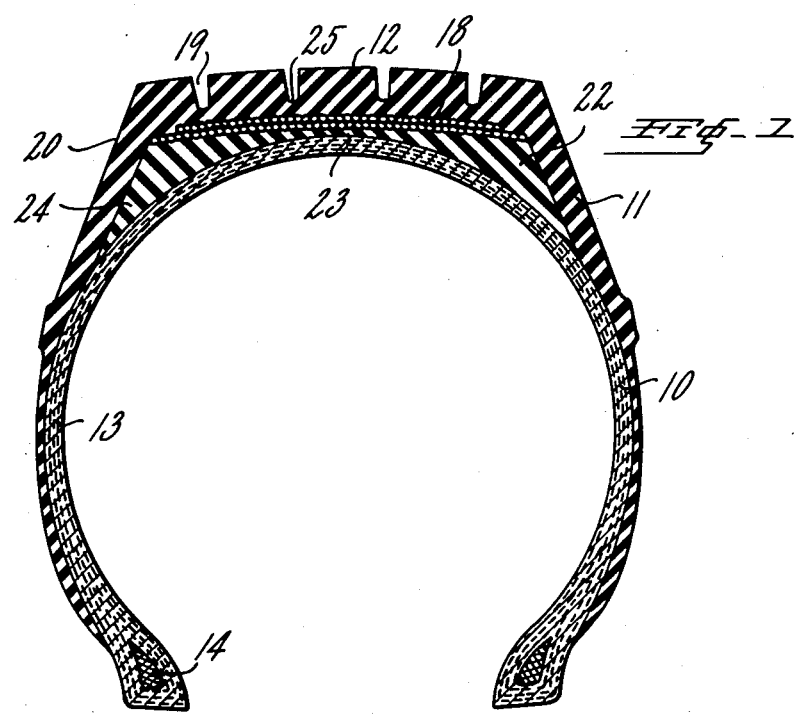
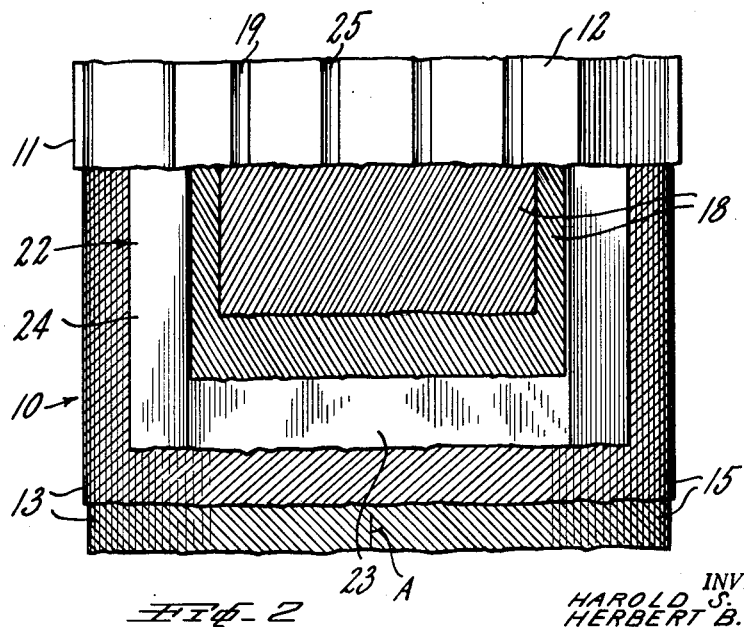
INVENTORS
HAROLD S. HOWE
HERBERT B. HINDIN
ROBERT S. KLANG
BY
James J. Long
AGENT March 26, 1957   H. S. HOWE ET AL   2,786,507
PNEUMATIC TIRE
Filed Feb. 26, 1954   2 Sheets-Sheet 2

INVENTORS
HAROLD S. HOWE
HERBERT B. HINDIN
ROBERT S. KLANG
BY James J. Long
AGENT

United States Patent Office 2,786,507
Patented Mar. 26, 1957

2,786,507

PNEUMATIC TIRE

Harold S. Howe, Detroit, Herbert B. Hindin, St. Clair Shores, and Robert S. Klang, Royal Oak, Mich., assignors to United States Rubber Company, New York, N. Y., a corporation of New Jersey Application February 26, 1954, Serial No. 412,748

6 Claims. (Cl. 152—355)

This invention relates to an improved pneumatic tire, and more particularly it relates to a pneumatic tire casing embodying especially disposed wire breaker.

One object of the invention is to provide a pneumatic tire that has increased rupture resistance.

Another object is the provision of a tire casing that resists penetration by stones, glass or other hazardous objects.

A further object is the provision of a pneumatic tire construction that is resistant to groove cracking.

An additional object of the invention is the provision of a tire assembly that not only resists tread separation, but does not throw off the tread even if such separation occurs.

Still a further object is to provide a tire construction in which the tread does not "grow."

Yet another object is the provision of a pneumatic tire construction that permits unprecedented latitude in the selection of cord angle in the reinforcing plies, and in practice permits the employment of heretofore unrealizable favorable combinations of cord angles in the carcass plies and breaker plies.

A further object of the invention is the provision of a pneumatic tire casing in which textile reinforcing elements, including the synthetic textiles having high stretch characteristics, notably rayon and nylon, may be used in the carcass plies without the usual detrimental consequences.

An additional object includes the construction of a tire casing having greater stability than conventional constructions.

Another object is to construct an improved tire casing embodying a wire breaker.

It is still an additional object to provide a pneumatic tire construction in which the tread is essentially isolated from the carcass strains.

The manner in which the invention accomplishes the foregoing objects, as well as additional objects and advantages, will be made manifest in the following detailed description, which is intended to be read with reference to the accompanying drawings, wherein:

Fig. 1 is a transverse sectional view of a pneumatic tire constructed according to the invention;

Fig. 2 is a fragmentary plan view of the tire of Fig. 1, with parts broken away;

Figure 3:
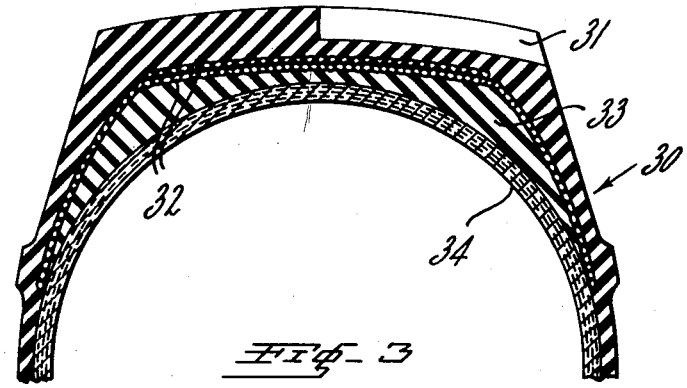
Figs. 3 and 4 are fragmentary transverse sectional views of modifications of the invention.

Referring to the drawing, the pneumatic tire of the invention comprises an interior reinforcing carcass 10 having overlying extensible vulcanized rubber sidewalls 11 and an abrasion resistant vulcanized rubber tread portion 12. The carcass 10 is composed of a plurality of plies 13 of textile cord fabric that are overlapped at their ends around inextensible wire bead assemblies 14. Each ply of cord fabric is coated on each side with rubber carcass stock so that the carcass cords 15 are embedded in rubber, and the cords are usually given a preliminary adhesive treatment to insure good adhesion to the carcass stock. The cords in each ply proceed on a diagonal or bias from one bead of the tire to the other, along a definite path characterized by a definite cord angle, that is usually designated as the lesser angle at the intersection of the cord with the crown center line, as indicated at A in Fig. 2, and alternate plies are disposed so that the cords run in opposite directions, for better balance.

It will be understood that the carcass is initially assembled in the flat on the surface of a collapsible tire building drum (not shown), by superimposing the required number of plies of rubberized tire fabric and incorporating the bead assemblies therewith. Thereafter, the carcass is expanded or shaped into typical tire or toroidal form, either with the aid of the usual shaping box (not shown) in which the usual doughnut-shaped curing bag is inserted within the carcass, or with the aid of the automatic shaping and vulcanizing press containing an integral curing bag or blanket. The process of converting the carcass from a flat band to a doughnut shape involves considerable distortion and places definite limitations on the cord angle that can be selected, and other considerations also place limitations on the cord angle, as will appear more fully below. In practicing the present invention the carcass cord angle typically falls within the range of from 25° to 45° as measured at the crown in the finished tire, and a particularly unusual feature of the invention lies in the employment of carcass cord angles in the range of from 25° to 35°. The latter angles are definitely below the range considerd usable in accordance with conventional practice, and such low angles introduce possibilities of decided advantages, particularly with respect to stability of operation and improved steering qualities. As is understood by those skilled in the art of building tires, the angle of the cords as applied to the building drum will be higher than the angle in the finished tire by a factor dependent mainly on the degree of expansion that takes place as the carcass is shaped.

In the typical practice of the invention the carcass cords are made of high stretch synthetic textile fibers, especially rayon or nylon, although if desired the invention may be practiced with the other textile materials such as cotton. The textile material is ordinarily employed in the form of cords or plied yarn.

The tire assembly includes two additional reinforcing strips 18 made of wire tire fabric, that is, cord fabric in which the cords are essentially adjacent parallel wire cables or elements, generally made at least in part of ferrous wires, preferably steel, although iron wires are also suitable. The wire may be treated previously to render it more adhesive to rubber, and the wire cord fabric is covered on each side with a thin layer of vulcanizable rubber in essentially the same manner as textile tire fabric. The additional strips 18 comprise what will hereinafter be referred to as a "breaker" although the term "shock pad" is also sometimes applied to such additional reinforcing plies. The plies or strips comprising the breaker are essentially equal in width to the width of the tread surface, that is, they extend across the tire continuously underneath the bases of the tread grooves 19 and they terminate substantially at the shoulders 20 of the tire. The wire cables in the breaker strips are disposed on a bias at a definite angle, suitably within the range of from 25° to 45° in the finished tire and the cables in alternate plies run in opposite directions, for balance.

Disposed between the underside of the lower breaker strip and the upper surface of the carcass there is an additional layer 22 of rubber stock, which is critically proportioned to provide a required critical positioning of the breaker strips. The additional layer has a minimum thickness at the center 23 or crown line and gradually increases in thickness as an exponential function, preferably a substantially parabolic function, of the distance from the center line, and achieves a maximum thickness 24 toward the shoulders where it terminates at the termination of the breaker strips. The intervening layer 22 is devoid of textile or equivalent reinforcement. The stock 22 is referred to here as devoid of reinforcement only in the sense that the substance of such intervening layer 22 is not restrained by textiles or the like, in contrast to the carcass and breaker, which are restrained by filamentary reinforcement in the form of textile cord or wire.

The additional rubber layer and the breaker strips are suitably assembled in proper relation by superimposing these members in proper order on the carcass plies on the tire building drum. The additional rubber layer may suitably be forced previously by extrusion of vulcanizable rubber stock. The tread and sidewall are then associated with the assembly in accordance with known practice, and the whole assembly is cured in the usual vulcanizing mold.

Because of the shape and relative spacing of the intervening stock, the breaker assembly typically follows the rather flat contour of the tire tread surface, rather than the contour of the carcass. It will be understood that in the usual present day tire constructions the curve of the crown region of the carcass is not parallel or concentric with the tread surface, but, instead, the tread is essentially quite flat in comparison with the more rounded crown contour of the carcass. A unique characteristic of the breaker arrangement of the invention is that in such constructions the breaker is parallel to or concentric with the tread surface, and the breaker departs from the carcass crown curve by a proportionately increasing amount at increasing distances from the center, where it is essentially in contact with the carcass, being separated therefrom only by a layer of rubber having a thickness of the order of the rubber skim coats covering the fabric.

In the modification of the invention shown in Fig. 3, a tire 30, provided with a tread 31 having cleats or lugs, contains a pair of breaker strips 32 of low stretch wire cord fabric, and a layer 33 of rubber in between the breaker assembly and the carcass 34. The layer 33 is thin at the center of the tire and gradually increases in thickness toward the shoulders. Instead of terminating near the shoulders, one or both of the breaker strips 32 may be continued or turned downwardly into the sidewall region where such strip or strips gradually comes closer to the carcass, and terminates approximately half way down the sidewall.

Figure 4:
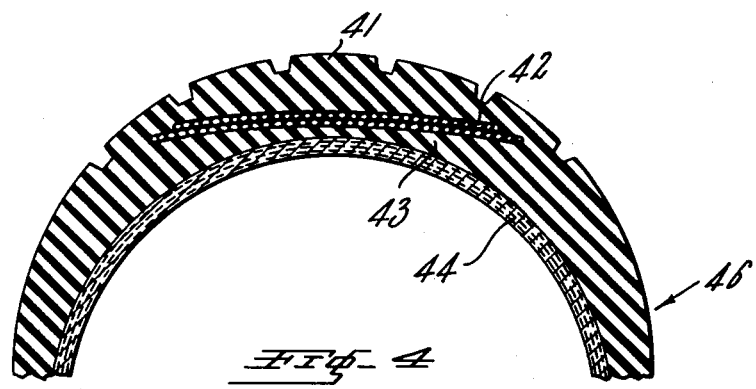

In the modification of the invention shown in Fig. 4, a tire 40 with a more rounded type of tread 41 is provided with a pair of breaker plies 42 disposed in accordance with the invention. A rubber layer 43 disposed between the breaker and the carcass 44 has a minimum thickness at the center and gradually increases in thickness toward each side. The breaker in this case is less parallel to the tread surface than in the forms of the invention utilizing a relatively flatter tread.

Figure 5:
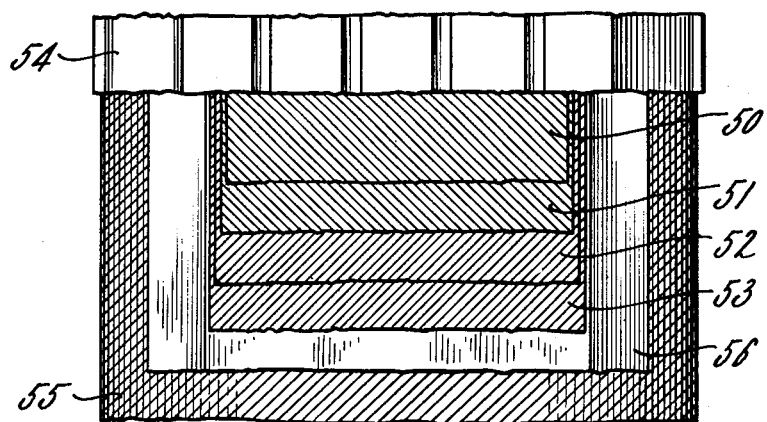
Fig. 5 is a fragmentary plan view of a modification of the invention, with parts broken away.

A particularly preferred modification of the invention is illustrated in Fig. 5, wherein the breaker is comprised of four layers 50, 51, 52 and 53 of rubberized wire tire fabric underlying the tread 54 and spaced from the multiply carcass 55 by an intervening layer 56 of rubber stock proportioned as described. In this modification, the wire cords are unusually closely spaced to provide enhanced resistance to penetration, and, to the same end, the cords in the first two plies 50, 51 run in the same direction, while those in the third and fourth plies 52, 53 run parallel to each other in a direction transverse to that of the first pair of plies. The object of thus closely spacing the cords and having pairs of adjacent plies so disposed as to run in the same direction is to provide a greater cord density, with the result that it is more difficult for penetrating objects to pass through the breaker. For this same purpose, we prefer to build this modified form of tire with somewhat more than the usual drum shoulder height as measured on the tire building drum, in order that the relative degree of expansion may be somewhat less than usual when the tire is converted into its final shape. As a consequence of such reduced expansion there is less tendency for the spacing of the cords to increase, and hence the desired high cord density is more nearly preserved.

As described, we typically employ an even number of wire breaker plies, so that there are an equal number of plies having cords running in each direction, for proper balance. The advantage of this construction is that the breaker assembly is decidedly flexible, as a result of the angle employed and the relative disposition of the plies, in contrast to certain constructions proposed in the prior art, which provide a definitely rigid breaker that would not be satisfactory for purposes of the present invention. In particular the present preferred constructions avoid such rigidity by reason of the fact that the paths of the cords in successive plies of the breaker do not in any case cross in more than one direction. If the cords of successive breaker plies crossed in two or more substantially different directions, then there would be a tendency for the breaker assembly to become unduly rigid, and the advantages of the present construction would not be realized.

To demonstrate the effectiveness of the present construction a number of tires were built and tested extensively. The tests showed that the present tires were completely free from groove cracking, and even when cuts were deliberately made in the groove bases, such cuts did not grow in use. In the inventors' extensive experience such phenomenal resistance to cut growth has never before been attained with an ordinary fabric tire carcass, and this result is particularly surprising in a tire having a nylon carcass. In fact, growth and consequent groove cracking constitute so serious a problem in the ordinary nylon tire that some manufacturers multiply the carcass plies in an attempt to minimize it, with indifferent success. Thus, one practice is to use 12 plies of nylon in what should be an 8 ply tire of ordinary textile material, even though the nylon is a much stronger material than the ordinary textiles. Such practice completely vitiates one of the great potential advantages of nylon, namely, the ability to make a lighter and thinner, and therefore cooler-running and longer-lasting, tire by reason of the superior strength of the nylon. Thus, by elimination of groove cracking the present invention for the first time makes possible the true realization of the inherent advantages of synthetic textiles such as nylon.

The present construction also makes it possible to use widely different cord angles in the breakers and in the carcass. Ordinarily, the cord angle in the carcass could not differ from the cord angle in the breakers by more than a few degrees, otherwise difficulties would be experienced in shaping the tire. With the present construction differences in cord angle of the order of 5° or 10°, or even more, are feasible because of the manner in which the breaker strips are separated from the carcass by an additional layer of rubber.

Because groove cracking has been eliminated as a factor, much lower angles can now be employed in the cracass than were formerly feasible. Formerly, low cord angles in the carcass were not feasible because they greatly aggravated groove cracking. At the same time, low cord angles were desirable because they provided improved stability and fabric fatigue resistance, as well as more favorable riding characteristics. With the present invention the desirable low cord angles can be employed in the carcass, without fear of groove cracking. At the same time, because the cord angle of the breaker is essentially independent of the cord angle in the carcass, desirably lower cord angles can be employed in the breaker along with the low cord angle in the carcass. Such lower cord angles in the breaker are desirable because they provide increased resistance to tread separation. Hence, the invention makes possible heretofore unrealizable combinations of cord angles, with highly advantageous results.

Aside from the effect of the present construction on groove cracking, the wire breakers serve to greatly enhance the rupture resistance of the casing, and its resistance to penetrating objects. It was observed by actual test that the Olsen rupture energy values of the present tire were 200 to 300% greater than those of a conventional nylon tire. It was also noted that the present tire reacted differently at the rupture point, since it deflected over a comparatively wide area, in contrast to the conventional tires, which deflect over a very narrow area and envelop the penetrating object. The rupture and hazard failure resistance of the present construction are not significantly reduced when the tread is worn to no antiskid depth. This contrasts directly with the susceptibility to these failures of a conventional textile tire in the final stages of tread wear.

By the present construction, difficulties arising from employment of textile carcass reinforcement and the wire breaker strips of vastly different materials are avoided, because of the manner in which the breakers, are disposed. In this respect the invention may be regarded as a new mode of reconciling what have heretofore been regarded as basically incompatible materials. If it were not for the present construction, it would not be possible for steel breakers to be used with a textile carcass because the steel, having markedly differently flexing and stretch characteristics, would soon separate from the textile carcass, with consequent failure. The present construction not only overcomes this separation difficultly, but actually provides a construction having greater resistance to tread separation than an all-textile reinforced tire or an all wire-reinforced tire.

It should also be noted that in ordinary all wire-reinforced tires it is necessary to use high inflation pressures to minimize the deflection, since early fatigue failure results in such a tire unless the deflection is very small. The high inflation pressures, in turn, are hard on the vehicle and consequently maintenance costs become excessive. The present construction by employing a textile carcass avoids this difficulty and yet retains the advantages of wire with respect to groove cracking and penetration resistance.

Because the isolating layer of rubber stock disposed between the carcass and the breaker strips is proportioned as described so as to have an increasing thickness at increasing distances from the center line, the unit strain transmitted from the flexing carcass to the breaker is extremely small. Thus, the center or crown of the carcass represents essentially a neutral point, at which the carcass does not stretch, and at this point the thickness of the intervening layer of rubber may be at a minimum. With increasing distances from the center, the carcass stretches to a proportionately greater extent, and the thickness of the rubber between the carcass and the breaker is similarly proportionately greater so that there is proportionately more rubber to take up the strains. The result is that the breaker is subjected only to a very low level of uniform strain, in spite of the wide variation of strains imposed on the carcass, and the breaker and tread are therefore essentially isolated from the carcass. The improvements in tread separation and groove cracking are believed to be a direct consequence of this feature.

When the present tire is inflated the carcass itself increases in size but the tread, since it is isolated from the carcass and reinforced by essentially inextensible wire breaker strips, does not grow in width, and therefore there is no cracking problem arising from growth. The reduction in tread growth and movement also manifests itself in the form of improved tread wear. Because rupture and penetration resistance are provided by the wire breakers, the carcass itself may be made considerably lighter and need not be as strong as in conventional tires. This permits the use of reduced end count carcass fabric, as well as a reduced number of plies, for equivalent strength. This not only provides economy in construction, but results in improved performance, because the lighter and thinner tire is cooler and more long lasting.

In one series of tests, the tires of the invention were subjected to a cleated wheel separation test, and were removed unfailed after 90 hours. A corresponding conventional tire would last only about 50 hours in the same test. The tires of the invention were further tested for resistance to separation on an 84 inch dynamometer. A localized separation developed at 120 M. P. H. but the tread was not thrown from the tire. This indicates a major safety advantage. In the same test, the tread of a conventional tire would separate and be thrown off at a speed of about 90 M. P. H.

Tires of the invention continued to run for an additional 100 hours after localized separation, with only minor separation growth. The additional safety factor provided by the present construction in this respect is particularly significant at present day high speeds.

It should also be noted that because the breaker assembly has a comparatively flat contour, i. e., it is more nearly flat than rounded, it is not subjected to undesirable distorting strains, since it is curved essentially in only one direction (i. e., circumferentially), rather than being a highly compound curve, as would be the case if the breaker followed the curvature of the carcass.

Because the present breaker construction does not interfere with the flexing of the carcass, the tire does not ride hard.

It should be noted that the breaker arrangement of the invention does not sacrifice any of the thickness of tread stock available for wear because the minimum distance from the tread surface to the outer surface of the breaker is essentially as in conventional constructions. When the tire is under load, the breaker, like the tread surface, is essentially flat and parallel to the surface of the road, and the breaker is typically at no point closer to the tread surface than at the center, at which point the breaker is adjacent to the carcass. Hence the full available anti-skid depth is utilizable in the present construction.

The term "rubber" as used herein of course comprehends synthetic rubber as well as natural rubber.

Having thus described our invention, what we claim and desire to protect by Letters Patent is:

1. A pneumatic tire comprising in combination, a carcass comprising plies of cord fabric formed of textile cords and having a cord angle of from 25° to 45°, a rubber tread and sidewalls superimposed on said carcass, the tread surface having a larger radius of curvature than the carcass, a breaker assembly comprising at least two plies of wire tire fabric formed of rubber covered, straight, parallel wire elements having an angle of from 25° to 45°, the aforesaid angles being the lesser angles between the cord or wire and the crown center line of the tire, the wire elements in one ply crossing those in the other plies but not in more than one direction, said breaker assembly extending across said tread substantially parallel to the tread surface and a layer of rubber stock between said breaker assembly and carcass of increasing thickness from the crown center of the carcass toward the shoulders of the tire for spacing and isolating said breaker assembly from said carcass, whereby the different flexing and stretch characteristics of the textile cords and wire elements are rendered compatible.

2. A pneumatic tire as in claim 1, in which each side portion of at least one of the said breaker plies extends into the sidewall region of the tire.

3. A pneumatic tire comprising in combination, a carcass formed of plies of rubber coated, non-metallic, textile cords passing diagonally on a bias from one bead of the tire to the other at an angle of from 25° to 45°, the aforesaid angle being the lesser angle between the cords and the crown center line of the tire, said carcass having a definite radius of curvature at the crown thereof, a rubber tread and sidewalls superimposed on said carcass, the tread surface having a larger radius of curvature than the carcass crown, a breaker comprising at least one pair of breaker plies made of rubber covered substantially inextensible, non-woven, straight, parallel wire elements, the paths of the wire elements in different breaker plies crossing those in other breaker plies but not in more than one direction, the breaker assembly being substantially parallel to the surface of the tread, said breaker assembly being spaced from the carcass by an intervening layer of rubber stock of increasing thickness from the crown center of the carcass toward the shoulders of the tire, whereby the radically different stretch characteristics of the said textile cords and the said wire elements are rendered compatible.

4. A pneumatic tire comprising in combination, a carcass having a plurality of plies of rubber coated non-metallic textile cord fabric, the carcass cord angle being from 25° to 45°, rubber tread and sidewall portions superimposed on said carcass, the radius of curvature of the tread surface being greater than the radius of curvature of the crown of the carcass, a breaker comprised of at least one pair of breaker plies consisting of rubber coated non-woven straight wire elements having an angle of from 0° to 5° less than the carcass cord angle, the said angles being the lesser angles between the cord or wire elements and the crown center line of the tire, the paths of the wire elements in different breaker plies crossing those in other breaker plies but not in more than one direction, the wire elements being substantially inextensible in comparison to the textile carcass cords, an intervening layer of rubber stock disposed between the breaker assembly and the carcass, said intervening layer having its thickest portion toward the shoulders of the tire and tapering to a lesser thickness at the center, and the breaker assembly being substantially parallel to the tread surface, whereby adverse effects that would otherwise flow from the vastly different stretch characteristics of the wire elements and carcass cords are substantially avoided.

5. A pneumatic tire as in claim 4 in which the carcass cords are made of nylon.

6. A pneumatic tire as in claim 1 in which the said breaker assembly comprises at least four plies of closely-spaced wire elements, the wire elements in the first and second breaker plies running parallel to each other in the same direction, and the wire elements in the third and fourth breaker plies running parallel to each other in a single direction transverse to that of the wire elements in the first and second breaker plies, whereby there is provided a high density of wire elements that resists penetrating objects.

References Cited in the file of this patent
UNITED STATES PATENTS

| | | |
|---|---|---|
| 1,554,370 | Renner | Sept. 22, 1925 |
| 2,020,190 | Jones | Nov. 5, 1935 |
| 2,059,764 | Zerrillo | Nov. 3, 1936 |
| 2,305,819 | Vorwerk | Dec. 22, 1942 |
| 2,493,614 | Bourdon | Jan. 3, 1950 |
| 2,541,506 | Cuthbertson et al. | Feb. 13, 1951 |